(12) United States Patent
Fujii et al.

(10) Patent No.: US 11,161,199 B2
(45) Date of Patent: Nov. 2, 2021

(54) FRICTION BONDING METHOD (71) Applicant: OSAKA UNIVERSITY, Suita (JP)

(72) Inventors: Hidetoshi Fujii, Suita (JP); Rintaro Ueji, Suita (JP); Yoshiaki Morisada, Suita (JP)

(73) Assignee: OSAKA UNIVERSITY, Suita (JP)

( * ) Notice: Subject to any disclaimer, the term of this patent is extended or adjusted under 35 U.S.C. 154(b) by 792 days.

(21) Appl. No.: 15/748,349

(22) PCT Filed: Jul. 11, 2016

(86) PCT No.: PCT/JP2016/003281
§ 371 (c)(1),
(2) Date: Jan. 29, 2018

(87) PCT Pub. No.: WO2017/022184
PCT Pub. Date: Feb. 9, 2017

(65) Prior Publication Data
US 2018/0214974 A1    Aug. 2, 2018

(30) Foreign Application Priority Data

Jul. 31, 2015   (JP) .............................. JP2015-152112

(51) Int. Cl.
*B23K 20/00* (2006.01)
*B23K 20/12* (2006.01)
(Continued)

(52) U.S. Cl.
CPC ............... *B23K 20/12* (2013.01); *F16B 5/08* (2013.01); *B23K 2101/20* (2018.08); *B23K 2103/04* (2018.08)

(58) Field of Classification Search
CPC ....... B23K 20/12; B23K 20/129; B23K 11/02
See application file for complete search history.

(56) References Cited

U.S. PATENT DOCUMENTS

| 2009/0305077 | A1* | 12/2009 | Mizuguchi | ............. | B23K 20/12 428/654 |
| 2016/0023300 | A1* | 1/2016 | Kimura | .................. | B23K 31/02 492/1 |
| 2016/0155878 | A1* | 6/2016 | Iwata | ................ | H01L 31/03923 136/262 |

FOREIGN PATENT DOCUMENTS

| JP | 53127348 A | * | 11/1978 | ............. B23K 20/12 |
| JP | 11077338 A | * | 3/1999 | |

OTHER PUBLICATIONS

JP-11077338-A computer translation (Year: 1992).*

* cited by examiner

*Primary Examiner* — Erin B Saad
(74) *Attorney, Agent, or Firm* — Westerman, Hattori, Daniels & Adrian, LLP (57) ABSTRACT

Provided are a simple and effective friction welding method that can suppress increases in hardness of the welded part and reductions in hardness (strength) in the heat affected zone regardless of the composition of ferrous material, and a welded structure obtained with the same. The present invention relates to a friction welding method wherein surfaces to be welded of two metal members (2, 4) to be welded are made to slide in contact with each other. The friction welding method is characterized in that at least one of the metal members (2, 4) to be welded is a ferrous material, and the maximum temperature reached during welding is equal to or less than the $A_3$ point or equal to or less than the $A_{cm}$ point of the ferrous material. The maximum temperature reached during welding is preferably equal to or less than the A1 point of the ferrous material.

9 Claims, 5 Drawing Sheets

(51) Int. Cl.
*F16B 5/08* (2006.01)
*B23K 101/20* (2006.01)
*B23K 103/04* (2006.01)

FRICTION BONDING METHOD

TECHNICAL FIELD

The present invention relates to a friction welding method of metal members, more specifically relates to a friction welding method which is applicable to various kinds of ferrous materials and can improve joint properties drastically, and a welded structure obtained by the method.

BACKGROUND ART

Recently, a solid phase welding (friction welding) method where heat generation phenomenon due to friction is utilized has been paid attention as a welding method which can lower reduction of strength at a welded part in comparison with the conventional melt welding methods. As the solid welding methods, examples include "friction stir welding (FSW)" where the welding is achieved by pressing a columnar tool which rotates at a high speed into a member to be welded, "friction pressure welding" where the welding is achieved by contacting a member to be welded which rotates at a high speed with a member to be welded which is fixed, and "linear friction welding" where the welding is achieved by sliding reciprocally members to be welded in contact with each other, and the like. In this description, the conventional friction welding is named as "friction pressure welding."

Kinds and combinations of the members to be welded which are welded through friction include many cases, and with respect to steels which are usual structural members, intensive study has been done. For example, Patent Document 1 (JP2001-287051A) proposes a method which provides a friction pressure welding joint of high tensile steel whose hardness becomes almost uniform over the direction of the radius of rotation of the friction pressure welding.

The friction pressure welding joint of high tensile steel described in Patent Document 1 is a friction pressure welding joint of high tensile steel having a fine structure of a crystal grain diameter of 2 μm or below, a tensile strength of 60 kgf/mm$^2$ or above, and a carbon content of 0.1 wt % or below, and the carbon content of the high tensile steel is suppressed as low as 0.1 wt %. Due to the low carbon content of 0.1 wt % or below, when carrying out the friction pressure welding, the structural change at peripheral part of the high tensile steel can be suppressed to suppress the hardening.

Further, Patent Document 2 (JP2002-294404A) proposes a high carbon steel material suited for friction pressure welding with less increase in hardness at friction pressure welding, and provides its production method.

The member (steel member) to be welded through friction pressure welding is subjected to extremely rapid heating and cooling cycle where the member is rapidly heated to a temperature of just below its melting point for about 10 seconds under a high pressure and then rapidly cooled from 1200° C. or more. As a result, the crystal grain of the member is coarsened at the rapid heating, and thereafter, transformed to a hard martensite phase at the rapid cooling, which makes the hardness of the welded part increase.

To the contrary, according to the high carbon steel described in the above Patent Document 2, by including a solid solution Nb in an amount of 0.005% or more, it is possible to prevent the austenite crystal grain of the high carbon steel from coarsening, and a grain number of austenite measured after heat treatment at 800° C.×5 minutes by oxidization method according to the standard of JIS G 0551 is 9 or more, which results in suppressing the increase of the hardness of the friction pressure welded part.

PRIOR ART DOCUMENT

Patent Document

Patent Document 1: JP2001-287051A
Patent Document 2: JP2002-294404A

SUMMARY OF THE INVENTION

Problem to be Solved by the Invention

However, in the friction pressure welding joint described in Patent Document 1, since it is necessary that the carbon content of the high tensile steel is 0.1 wt % or below, the members to be welded is restricted to the extremely narrow range.

Also in the friction pressure welding joint described in Patent Document 2, the composition of the steel being usable as a member to be welded is restricted. In addition, it is not possible to suppress the lowering of the hardness (strength) in a heat affected zone effectively. Particularly, in the friction welding where the members are slide with each other, it is difficult to control the joint properties.

Considering the above problems in the conventional technical arts, the present invention can provide a simple and effective friction welding method that can suppress increases in hardness of the welded part and reductions in hardness (strength) in the heat affected zone regardless of the composition of ferrous material, and a welded structure obtained by the method.

Means to Solve the Problems

In order to realize the above object, as a result of the intensive study as to the conditions of the friction welding, the present inventors have found that it is quite effective that the sliding speed of the members to be welded is controlled at a low speed to suppress the heat generation at the friction, and at the same time, that the heat generation at the processing of the member to be welded is utilized, and then have completed the present invention.

Namely, the present invention provides a friction welding method where surfaces to be welded of two metal members to be welded are made slide in contact with each other, wherein;

at least one of the metal members to be welded is a ferrous material, and a maximum temperature reached during welding is equal to or less than the A$_3$ point or equal to or less than the A$_{cm}$ point of the ferrous material. Here, the ferrous material widely includes metal materials which contain iron as a main component, and includes steels and cast iron materials. Here, when the ferrous material is a hypoeutectoid steel, the A$_3$ point is used, and when a hypereutectiod steel, the A$_{cm}$ point is used.

In general friction welding, the maximum temperature reached during welding is higher than the A$_3$ point or the A$_{cm}$ point of the ferrous material which is the member to be welded. Particularly, in case of the conventional friction pressure welding and the linear friction welding, since the welding is achieved by discharging an oxide film of the interface to be welded together with a flash, in order to discharge a sufficient amount of the flash, it is necessary to elevate the welding temperature to a temperature higher than the $A_3$ point or the $A_{cm}$ point (to soften the welded part sufficiently (to make the structure of the welded part austenite)).

To the contrary, according to the friction welding method of the present invention, since the maximum temperature reached during welding is equal to or less than the $A_3$ point or equal to or less than the $A_{cm}$ point of the ferrous material, the base metal (structure of the base metal other than a hard phase) at the welded part during the welding process is a dual structure of ferrite and austenite, a dual structure of cementite and austenite, or a dual structure of ferrite and cementite. As a result, since the region of ferrite is not transformed, it is possible to reduce exactly the region where the martensite is formed.

In the friction welding method of the present invention, it is preferable that the maximum reached temperature is equal to or less than the $A_1$ point of the ferrous material. When the maximum temperature reached during welding process is equal to or less than the $A_1$ point of the ferrous material which is the member to be welded, the transformation is not generated in the welded part and the martensite is not formed. In addition, since the welding can be achieved at a lower temperature in comparison with the conventional friction welding, it is possible to suppress the formation of the heat affected zone. As a result, it is possible to suppress the increases in hardness of the welded part and the reductions in hardness (strength) in the heat affected zone regardless of the composition of ferrous material.

Further, in the friction welding method of the present invention, it is preferable that friction heat generated by the sliding of the two metal members to be welded, and a processing heat generated by plastic deformation of the metal members to be welded are utilized together. Though the conventional friction welding is a method where the friction heat is utilized, when positively using the processing heat generated by plastic deformation of the metal members to be welded, it is possible to obtain a good joint at a lower welding temperature.

Further, in the friction welding method of the present invention, it is preferable that a welding pressure which is applied in the almost perpendicular to the surface to be welded is 100 to 300 MPa, and a maximum sliding speed of the metal member to be welded is 75 to 380 mm/sec, and more preferably the maximum sliding speed is 75 to 160 mm/sec. In comparison with the conventional friction welding, by making the welding pressure high and the maximum sliding speed extremely low, it is possible to make the welding temperature being equal to or less than the $A_3$ point or being equal to or less than the $A_{cm}$ point (preferably equal to or less than the $A_1$ point) of the ferrous material which is the member to be welded. In addition, it is possible to generate the processing heat due to the plastic deformation of the metal member to be welded, and thus a good joint can be obtained even at a low welding temperature. For the reference, in JIS Z 3607 which shows a friction pressure welding working standard of carbon steel, the lower limit of the peripheral speed used for the welding is 1000 mm/sec, which is entirely different from the sliding speed used in the friction welding method of the present invention.

Further, in the friction welding method of the present invention, it is preferable that the two metal members to be welded are both in the form of column, and end surfaces of the two metal members to be welded are made to rotate in contact with each other. By subjecting the friction welding to the so-called friction pressure welding, it is possible to control the processing conditions of the welding (the welding pressure and the maximum sliding speed, etc.) easily.

Further, the metal member to be welded is not limited to a solid form, but may be in the form of pipe. Furthermore, the shape of the metal member to be welded is not limited to a cylindrical shape, but may be, for example, in the angular shape.

The member to be welded which is used in the friction pressure welding has basically a cylindrical shape, and thus, the sliding speed at the welding depends on the diameter of the member to be welded (precisely, the sliding speed is zero at the rotation center and becomes large with increase of the rotation radius). Namely, the maximum sliding speed in the friction pressure welding is a sliding speed at an outermost peripheral of the member to be welded.

In case where the friction pressure welding is used as the friction welding of the present invention, it is preferable that the rotation speed of the member to be welded is 150 to 300 rpm. As mentioned above, since the sliding speed at the welding depends on the diameter of the member to be welded, in a generally usable diameter (for example, diameter of 10 mm), when the rotation speed is set to 150 to 300 rpm, it is possible to make the welding temperature being equal to or less than the $A_3$ point or being equal to or less than the $A_{cm}$ point (preferably equal to or less than the $A_1$ point) of the ferrous material which is the member to be welded. For the reference, the rotation speed used in the general friction pressure welding is thousands rpm, which is entirely different from the numerical range of the rotation speed used in the friction welding of the present invention.

Further, in case where the friction pressure welding is used as the friction welding, it is preferable that an upset pressure is 100 to 300 MPa, and a burn-off length is 0.5 to 3 mm. When the upset pressure is 100 to 300 MPa, and the burn-off length is 0.5 to 3 mm, it is possible to positively use the processing heat generated by plastic deformation of the metal members to be welded, and at the same time, to discharge the oxide coating film from the welded interface, which gives a good joint at a lower welding temperature.

Further, in the friction welding method of the present invention, it is preferable that a carbon content of the ferrous material is equal to or more than 0.2% by mass, more preferably equal to or more than 0.3% by mass. Though a ferrous material having a high carbon content (middle- or high-carbon steel) has problems as to large increase in hardness and generation of cracks at the welded part, according to the friction welding method of the present invention, since the formation of the martensite can be suppressed at the welded part, a good joint can be obtained. In addition, though the middle- or high-carbon steel having a high hardness (strength) has serious problem as to reduction in hardness (strength) in the heat affected zone, according to the friction welding method of the present invention, since the welding temperature is low, it is possible to suppress the reduction in hardness (strength) effectively.

Further, in the friction welding method of the present invention, it is preferable that the ferrous material is a high speed steel. According to the conventional friction pressure welding, it is difficult to bond the high speed steel which has a large plastic deformation resistance, and at the same time, it is difficult to maintain the high hardness (high strength) of the high speed steel in the heat affected zone. To the contrary, according to the friction welding method of the present invention, since the burn-off length is set to a short length, it is suitable to bond the high speed steel which has a large plastic deformation resistance, and since the welding temperature is low, it is possible to maintain the various reinforcing mechanisms, and to suppress the reduction in hardness (strength) of the heat affected zone.

Furthermore, in the friction welding method of the present invention, it is preferable that the neighborhood of the part to be welded is cooled forcibly by supplying a refrigerant to the neighborhood of the part to be welded during welding. Though the welding temperature can be controlled by the various process conditions such as the welding pressure and the maximum sliding speed, there is a case where distribution of the welding temperature may be yielded depending on the shape of the member to be welded. For example, in the friction pressure welding, since the sliding speed of the outermost peripheral becomes high, there are many cases where a temperature of the outermost peripheral zone becomes high in comparison with a temperature of the inside. Here, when supplying the refrigerant to the neighborhood of the part to be welded during welding, the welding temperature of the outermost peripheral can be lowered, and it is possible to prevent the welding temperature of the outermost peripheral from being beyond the $A_3$ point or the $A_{cm}$ point (preferably the $A_1$ point) of the ferrous material which is the member to be welded.

Further, when the welding temperature is equal to or less than the $A_3$ point or being equal to or less than the $A_{cm}$ point (preferably equal to or less than the $A_1$ point) of the ferrous material which is the member to be welded, it is possible to finely divide the ferrite and cementite by applying the external cooling with the refrigerant, and the mechanical properties (fracture toughness, etc.) of the joint can be improved. Furthermore, by applying the external cooling, the strength of the member to be welded can be maintained during the welding process, and it is possible to introduce large strain deformation into the neighborhood of the welded interface.

Further, the present invention provides a welded structure, which comprises a welded part formed by the friction welding method according to the present invention. The welded structure of the present invention is a welded structure having an extremely high reliability, because it is possible to suppress increases in hardness of the welded part and reductions in hardness (strength) in the heat affected zone regardless of the composition of ferrous material.

Furthermore, the present invention provides a welded structure having a butt-welding part of two metal members, which comprises:

at least one of the metal members is a steel material,
the welded interface of the butt-welding part is mainly composed of recrystallized grains,
regions having the recrystallized grains are distributed at an almost constant interval from the welded interface, and
a hardness of the neighborhood of the welded interface is 90 to 130% of a hardness of a base metal.

Though there is the friction stir welding as a welding method for forming recrystallized grains on the welded interface, in the friction stir welding where the region to be welded is stirred by injecting a rotating tool under pressure, the distribution of the regions having the recrystallized grains is not constant interval from the welded interface. Specifically, the distribution thereof at the neighborhood of the surface of the member to be welded which is affected by a shoulder portion of the tool strongly is different from the distribution at the center of a plate thickness. To the contrary, in the welded structure of the present invention, the regions thereof are distributed at an almost constant interval from the welded interface regardless the direction of the plate thickness. The welded structure of the present invention can be produced according to the friction welding method of the present invention.

In the welded structure of the present invention, since the structure near the welded interface is composed of fine equi-axed recrystallized grains, it is possible to obtain an excellent welded part in mechanical properties such as strength, toughness and reliability. Here, the recrystallized grain is formed in the course of plastic deformation and heating (temperature elevation) of the metal member to be welded, which is one of the important characteristics according to the friction welding method of the present invention. Further, in the friction welding method of the present invention, there is an effect that a recrystallizing temperature is lowered by introducing the large stain deformation into the neighborhood of the welded interface, which results in realizing the welding at a low temperature. To the contrary, according to the conventional friction welding method, since the welding temperature is high, the transformed structure is mainly formed in the neighborhood of the welded interface of the ferrous material.

Further, in the welded structure of the present invention, a hardness of the neighborhood of the welded interface is 90 to 130% of a hardness of a base metal. When the hardness of the neighborhood of the welded interface is 90 to 130% of the hardness of the base metal, it is possible to suppress the embrittlement of the welded part. More preferred hardness of the neighborhood of the welded interface is 100 to 120% of the hardness of the base metal.

Furthermore, in the welded structure of the present invention, it is preferable that a carbon content of the steel material is equal to or more than 0.2% by mass, more preferable is that the steel material is a high speed steel. When the carbon content of the steel material is equal to or more than 0.2% by mass, it is possible to endow the welded structure with sufficient strength, and when the steel material is the high speed steel, it is possible to endow the welded structure with higher strength and hardness.

Effects of the Invention

According to the present invention, it is possible to provide the simple and effective friction welding method that can suppress increases in hardness of the welded part and reductions in hardness (strength) in the heat affected zone regardless of the composition of ferrous material, and the welded structure obtained by the method.

MODE FOR CARRYING OUT THE INVENTION

In the following, by referring the drawings, typical embodiments of the friction welding method of the present invention and the welded structure obtained thereby are explained, but the present invention is not limited thereto. In the following explanation, the same symbol is given to the same or corresponding parts, and there is a case where overlapping explanation is omitted. In addition, since these drawings are presented to explain the concept of the present invention, there are cases where size and ratio of the structural elements are different from the real case.

(A) Friction Welding Method

Figure 1:
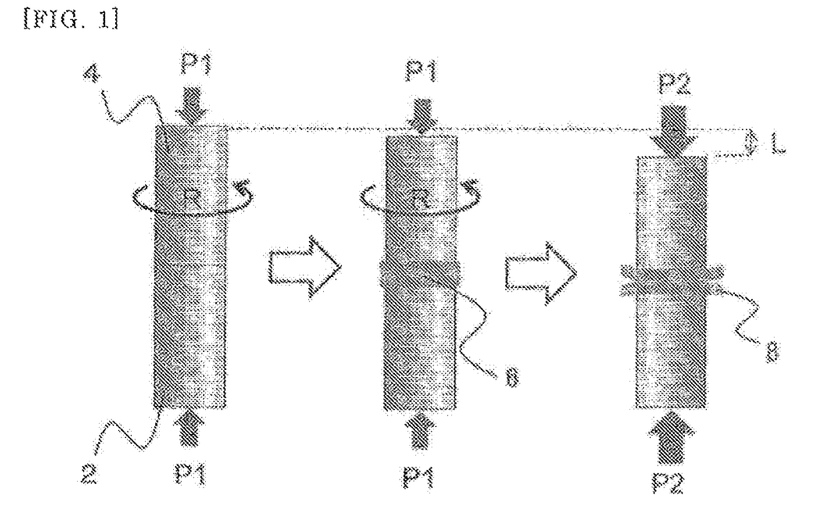
FIG. 1 is a schematic view showing the state of the friction welding according to the present invention.

In the following, the friction welding method of the present invention is explained in detail by referring a friction pressure welding as a typical model. FIG. 1 is a schematic view showing the state of the friction welding according to the present invention. An apparatus used in the friction pressure welding is not particularly limited as long as within the range that does not impair the effect of the present invention, and can be made of known conventional various kinds of friction pressure welding apparatuses.

In the friction welding method of the present invention, at least one of a member to be welded 2 and a member to be welded 4 is a ferrous material. The shape of the member to be welded 2 and the member to be welded 4 can be a shape that is applicable to various conventional known friction pressure welding, and there are employed a member having a sectional surface of ring or circle, namely a hollow member having a sectional surface of ring or a solid member having a sectional surface of circle, for example, a tube-like member, a columnar member, a corn-like member, or the like. The shape of the member to be welded 2 and the member to be welded 4 can also be made angular.

After butting on each end surface of the member to be welded 2 and the member to be welded 4, the member to be welded 2 is fixed, and then the member to be welded 4 is rotated at a given rotation speed R while pressing to the member to be welded 2 under a welding pressure P1, which results in sliding the members. The temperature near the interface to be welded rises by the friction heat due to the sliding by the rotation, which forms a softened region 6. Of course, it may be possible that the member to be welded 4 is fixed and the member to be welded 2 is rotated, or that the member to be welded 2 and the member to be welded 4 are both rotated together.

Next, when the softened region 6 reaches to a given welding temperature T and the burn-off length L reaches to a set value, the rotation of the member to be welded 4 is stopped suddenly and, then the member to be welded 4 is pushed to the member to be welded 2 under an upset pressure P2 (≥P1), which results in completing the welding.

Here, though, according to the conventional friction pressure welding, the maximum temperature $T_{max}$ reached during welding is higher than the $A_3$ point or the $A_{cm}$ point of the ferrous material of the member to be welded 2 and/or the member to be welded 4, according to the friction welding method of the present invention, since the maximum temperature $T_{max}$ reached during welding is equal to or less than the $A_3$ point or equal to or less than the $A_{cm}$ point of the ferrous material, the base metal (structure of the base metal other than a hard phase) at the welded part during the welding process is a dual structure of ferrite and austenite, a dual structure of cementite and austenite, or a dual structure of ferrite and cementite. As a result, since the region of ferrite is not transformed, it is possible to reduce exactly the region where the martensite forms. The $A_3$ point (° C.) of the ferrous material can be informed, for example, according to "$A_3$=937.2−436.5C+56Si−19.7Mn−16.3Cu−26.6Ni−4.9Cr+38.1Mo+124.8V+136.3Ti−19.1Nb+198.4Al+3315B" (substituting % by mass for each element in the above C, Si, and the like).

Further, since the maximum temperature $T_{max}$ reached during welding in the friction welding method of the present invention is remarkably lower than the case of the conventional friction pressure welding, it is possible to suppress the reduction in hardness (strength) of the heat affected zone (HAZ) formed near the welded part. As a result, it is suitably applicable to a steel having 780 MPa or more such as a high tensile steel, a tool steel or a high speed steel which has serious problem as to the reduction in hardness (strength) in the heat affected zone (HAZ).

Further, in the friction welding method of the present invention, it is preferable that the maximum temperature $T_{max}$ reached during welding is equal to or less than the $A_1$ point of the member to be welded 2 and/or the member to be welded 4. When the maximum temperature $T_{max}$ reached during the welding process is equal to or less than the $A_1$ point of the ferrous material, the transformation is not generated in the welded part and the martensite is not formed. In addition, since the welding can be achieved at a lower temperature in comparison with the conventional friction welding, it is possible to suppress the formation of the heat affected zone (HAZ) more effectively. As a result, it is possible to suppress the increases in hardness of the welded part and the reductions in hardness (strength) in the heat affected zone (HAZ) regardless of the composition of ferrous material which is used as the member to be welded 2 and/or the member to be welded 4. The $A_1$ point (° C.) of the ferrous material can be informed, for example, according to "$A_1$=750.8−26.6C+17.6Si−11.6Mn−22.9Cu−23Ni+24.1Cr+22.5Mo−39.7V−5.7Ti+232.4Nb−169.4Al−894.7B" (substituting % by mass for each element in the above C, Si. and the like).

Further, in the friction welding method of the present invention, it is preferable that friction heat generated by the sliding of the member to be welded 2 and the member to be welded 4, and a processing heat generated by plastic deformation of the member to be welded 2 and/or the member to be welded 4 are utilized together. Though the conventional friction welding is a method where the friction heat is utilized, when positively using the processing heat generated by plastic deformation of the member to be welded 2 and/or the member to be welded 4, it is possible to obtain a good joint at a lower welding temperature.

In order to bond by utilizing the processing heat generated by plastic deformation of the member to be welded 2 and/or the member to be welded 4, it is preferable that a welding pressure P1 which is applied in the almost perpendicular to the surface to be welded is 100 to 300 MPa, and a maximum sliding speed $V_{max}$ of the member to be welded 2 and the member to be welded 4 is 75 to 380 mm/sec, and more preferably the maximum sliding speed $V_{max}$ is 75 to 160 mm/sec. In comparison with the conventional friction welding, more or less depending on the shape, and the like of the member to be welded, by making the welding pressure P1 high and the maximum sliding speed $V_{max}$ extremely low, it is possible to make the welding temperature being equal to or less than the $A_3$ point or being equal to or less than the $A_{cm}$ point (preferably equal to or less than the $A_1$ point) of the ferrous material which is the member to be welded. In addition, it is possible to generate the processing heat due to the plastic deformation of the metal member to be welded, and thus a good joint can be obtained even at a low welding temperature T.

Specifically, when the welding pressure P1 is equal to or more than 100 MPa, it is possible to apply a pressure which is sufficient to form a welded interface without any non-welded part, and when being equal to or less than 300 MPa, it is possible not only to bond by employing a usual welding apparatus but also to prevent the member to be welded from remarkable deformation.

Further, when the maximum sliding speed $V_{max}$ of the member to be welded 2 and the member to be welded 4 is equal to or more than 75 mm/sec, it is possible to form the welded interface having a sufficient welding strength, and when being equal to or less than 300 mm/sec (more preferably equal to or less than 160 mm/sec), it is possible that the maximum temperature $T_{max}$ reached during welding is equal to or less than the $A_3$ point or equal to or less than the $A_{cm}$ point (preferably equal to or less than the $A_1$ point) of the ferrous material which is used as the member to be welded 2 and/or the member to be welded 4.

Further, in the friction welding method of the present invention, it is preferable that both of the member to be welded 2 and the member to be welded 4 are in the form of column, and end surfaces of the member to be welded 2 and the member to be welded 4 are made to rotate in contact with each other. By subjecting the friction welding to the so-called friction pressure welding, it is possible to control the process conditions of the welding (the welding pressure P1 and the maximum sliding speed $V_{max}$, etc.) easily. Further, the member to be welded 2 and the member to be welded 4 are not limited to a solid form, but may be in the form of pipe.

The member to be welded 2 or the member to be welded 4 which is used in the friction pressure welding has basically a cylindrical shape, and thus, the sliding speed V at the welding depends on the diameter of the member to be welded 2 or the member to be welded 4 (precisely, the sliding speed V is zero at the rotation center and becomes large with the increase of the rotation radius). Namely, the maximum sliding speed $V_{max}$ in the friction pressure welding is a sliding speed at an outermost peripheral of the member to be welded. In case of the linear friction welding, the maximum sliding speed $V_{max}$ is a maximum speed of each of the members to be welded in the reciprocal movement.

In case where the friction pressure welding is used as the friction welding, it is preferable that the rotation speed R of the member to be welded 4 is 150 to 300 rpm. As mentioned above, since the sliding speed V at the welding depends on the diameter of the member to be welded, in a generally usable diameter (for example, diameter of 10 mm), when the sliding speed R is set to 150 to 300 rpm, it is possible to make the welding temperature T being equal to or less than the $A_3$ point or being equal to or less than the $A_{cm}$ point (preferably equal to or less than the $A_1$ point) of the ferrous material which is the member to be welded.

Further, in case where the friction pressure welding is used as the friction welding, it is preferable that an upset pressure P2 is 100 to 300 MPa, and a burn-off length is 0.5 to 3 mm. When the upset pressure P2 is 100 to 300 MPa, and the burn-off length is 0.5 to 3 mm, it is possible to positively use the processing heat generated by plastic deformation of the members to be welded 2 and/or the member to be welded 4, and at the same time, to discharge the oxide coating film from the welded interface, which gives a good joint at a low welding temperature T.

Specifically, when the upset pressure P2 is equal to or more than 100 MPa, it is possible to sufficiently generate the processing heat due to the plastic deformation of the metal member to be welded 2 and/or the member to be welded 4, and when being equal to or less than 300 MPa, it is possible to bond by employing a general welding apparatus.

Further, when the burn-off length is equal to or more than 0.5 mm, it is possible to sufficiently generate the processing heat due to the plastic deformation of the metal member to be welded 2 and/or the member to be welded 4, and when being equal to or less than 3 mm, it is possible to give the desired burn-off length even if the maximum temperature $T_{max}$ reached during welding is equal to or less than the $A_1$ point of the member to be welded 2 and/or the member to be welded 4.

In the conventional friction pressure welding, the temperature near the welded interface becomes higher than the $A_3$ point or the $A_{cm}$ point of the ferrous material which is used as the member to be welded 2 and/or the member to be welded 4, and is softened sufficiently. As a result, when applying the upset pressure P2, the softened ferrous material is discharged only as a flash 8, and the processing heat is not almost generated. To the contrary, when employing the above welding conditions, the temperature near the welded interface is equal to or less than the $A_3$ point or the $A_{cm}$ point (preferably equal to or less than the $A_1$ point) of the ferrous material which is used as the member to be welded 2 and/or the member to be welded 4, and when the upset pressure P2 is applied at that state, the ferrous material which is used as the member to be welded 2 and/or the member to be welded 4 is plastically deformed. Furthermore, since a recrystallizing temperature can be lowered, the welding can be achieved at a temperature being equal to or less than the $A_1$ point.

The welding temperature T used in the friction welding method of the present invention is extremely low in comparison with a welding temperature used in the conventional friction pressure welding, which is decided ordinarily as the condition where the welding cannot be achieved. Namely, according to the friction welding of the present invention, there is proposed a novel welding method where the welding is realized by utilizing the processing heat in addition to the friction heat.

Further, in the friction welding method of the present invention, it is preferable that a carbon content of the ferrous material which is used as the member to be welded 2 and/or the member to be welded 4 is equal to or more than 0.2% by mass, more preferably equal to or more than 0.3% by mass. Though a ferrous material having a high carbon content (middle- or high-carbon steel) has problems as to large increase in hardness and generation of cracks at the welded part, according to the friction welding method, since the formation of the martensite can be suppressed at the welded part, a good joint can be obtained. In addition, though the middle- or high-carbon steel having a high hardness (strength) has serious problem as to reduction in hardness (strength) in the heat affected zone (HAZ), according to the friction welding method of the present invention, since the welding temperature T is low, it is possible to suppress the reduction in hardness (strength) effectively.

Further, in the friction welding method of the present invention, it is preferable that the ferrous material which is used as the member to be welded 2 and/or the member to be welded 4 is a high speed steel. According to the conventional friction pressure welding, it is difficult to bond the high speed steel which has a large plastic deformation resistance, and at the same time, it is difficult to maintain the high hardness (high strength) of the high speed steel in the heat affected zone HAZ). To the contrary, according to the friction welding method of the present invention, since the burn-off length is set to a short length, it is suitable to bond the high speed steel which has a large plastic deformation resistance, and since the welding temperature is low, it is possible to maintain the various reinforced mechanisms, and to suppress the reduction in hardness (strength) of the heat affected zone (HAZ).

Furthermore, in the friction welding method of the present invention, it is preferable that the neighborhood of the part to be welded is cooled forcibly by supplying a refrigerant to the neighborhood of the part to be welded during welding. Here, the refrigerant is not particularly limited unless the effect of the present invention is impaired, and it is possible to use water, liquid nitrogen, liquid $CO_2$, and the like. Here, from the relation of specific heat and heat conductivity, when using the liquid COs, the forced cooling can be achieved most effectively.

When the welding temperature is more than the $A_3$ point or the $A_{cm}$ point, the forced cooling by using the refrigerant gives adverse effect because the cooling speed becomes large and thus promotes the formation of the martensite, but when the welding temperature is equal to or less than the $A_3$ point or being equal to or less than the $A_{cm}$ point (preferably equal to or less than the $A_1$ point), since the forced cooling can contribute to the fining of the ferrite and the cementite, the mechanical properties can be improved very effectively.

Though the welding temperature T can be controlled by the various process conditions such as the welding pressure P1 and the maximum sliding speed $V_{max}$, there is a case where distribution of the welding temperature T may be yielded depending to the shape of the member to be welded 2 and the member to be welded. For example, in the friction pressure welding, since the sliding speed V of the outermost peripheral becomes high, there are many cases where the temperature of the outermost peripheral zone becomes high in comparison with temperature of the inside. Here, when supplying the refrigerant to the neighborhood of the part to be welded during the welding, the welding temperature T of the outermost peripheral can be lowered, and it is possible to prevent the welding temperature T of the outermost peripheral from being beyond the $A_3$ point or the $A_{cm}$ point (preferably the $A_1$ point) of the ferrous material which is used as the member to be welded 2 and/or the member to be welded 4.

(B) Welded Structure

Figure 2:
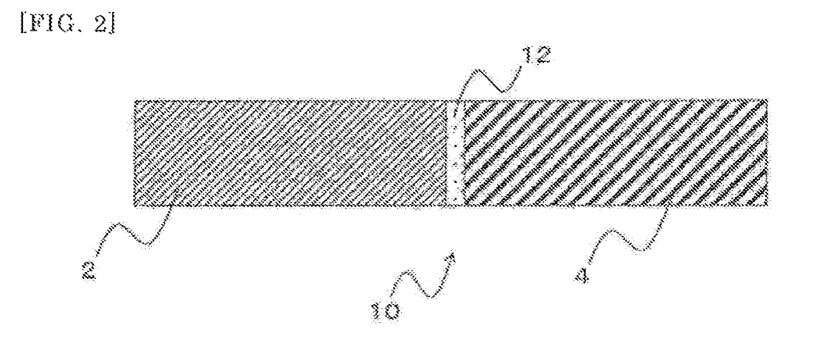
FIG. 2 is a schematic view showing the structure of the welded part in the welded structure according to the present invention.

FIG. 2 is a schematic view showing the structure of the welded part in the welded structure according to the present invention. The welded part 10 is formed by welding the member to be welded 2 and the member to be welded 4, and the member to be welded 2 and/or the member to be welded 4 is the ferrous material. The welded structure of the present invention is welded according to the friction welding method of the present invention, and FIG. 2 shows the welded part which is welded by the friction pressure welding.

In the welded part 10 there is not formed the considerable heat affected zone (HAZ), the welded structure has a high joint efficiency which gives an extremely high reliability. Further, it is preferable that the welded interface 12 is formed by the recrystallized grain. When the structure near the welded interface 12 is the fine equi-axed recrystallized grain, the welded part 10 has excellent mechanical properties such as strength, toughness and reliability.

Here, the recrystallized grain is formed due to lowering of the recrystallizing temperature which is caused by the plastic deformation of the member to be welded 2 and/or the member to be welded 4, which is one of the important characteristics according to the friction welding method of the present invention. To the contrary, according to the conventional friction welding method, since the welding temperature T is high, the transformed structure including the martensite is formed in the neighborhood of the welded interface 12 of the ferrous material.

Furthermore, in the welded structure of the present invention, it is preferable that the hardness of the neighborhood of the welded interface 12 is 90 to 130% of the hardness of the base metal of the member to be welded 2 or the member to be welded 4. When the hardness of the neighborhood of the welded interface 12 is equal to or more than 90% of the hardness of the base metal, it is possible to suppress the reduction of the joint efficiency due to the welded part 10, and when being equal to or less than 130%, it is possible to suppress the embrittlement of the welded part 10. More preferable hardness of the neighborhood of the welded interface 12 is 100 to 120% of the hardness of the base metal.

In the above, the typical embodiments of the friction welding method of the present invention and the welded structure obtained thereby are explained, but the present invention is not limited to these embodiments, and various changes in design may be possible, those changes may be included within the scope of the present invention.

Example

Example 1

A round rod of JIS-S45C (0.44% C-0.73% Mn-0.20% Si—0.04% Cr) having a diameter φ of 10 mm and a length of 100 mm was used as the member to be welded, and the two round rods were subjected to the friction welding. As the friction welding conditions, there were employed the rotation speed of 200 rpm, the friction pressure of 180 MPa, the burn-off length of 1 mm, the upset pressure of 180 MPa, and the controlling method of the friction steps was achieved according to friction length control. As the pre-heating, at the initial process of the welding, the two S45C rods were in contact with each other under 60 MPa, and one of the rods was rotated at 200 rpm and maintained for 2 seconds.

Figure 3:
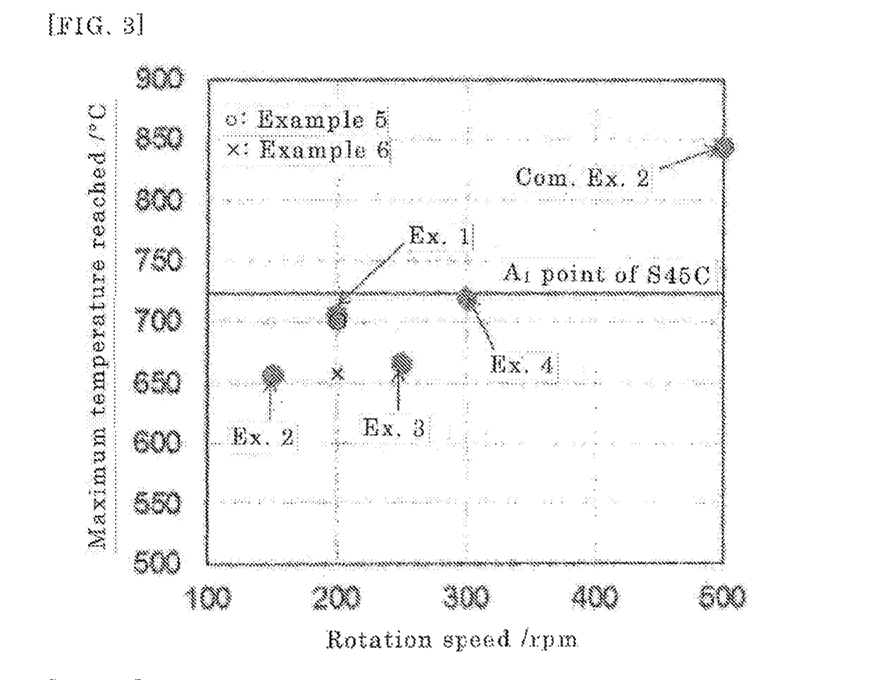
FIG. 3 is a graph showing the maximum temperature reached during welding.

The sectional surface of the welded part of the obtained present welded joint 1 was observed, and when the welding was completely achieved, the evaluation was ○, and when having un-welded part, the evaluation was x, and the results are shown in TABLE 1. The maximum temperature reached during welding was measured by a radiation thermometer, and the obtained values are shown in FIG. 3. In FIG. 3, the $A_1$ point of the S45C is indicated by a continuous line.

Figure 4:
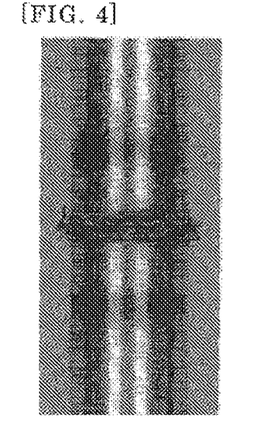
FIG. 4 is a photograph of the appearance of the present welded joint 1.

FIG. 4 is a photograph of the appearance of the present welded joint 1. From the photograph of the appearance, it has been confirmed that a good joint of the S45C material of the middle-carbon steel can be obtained. A discharged amount of the flash was smaller than that of the conventional friction welding joint.

Figure 5:
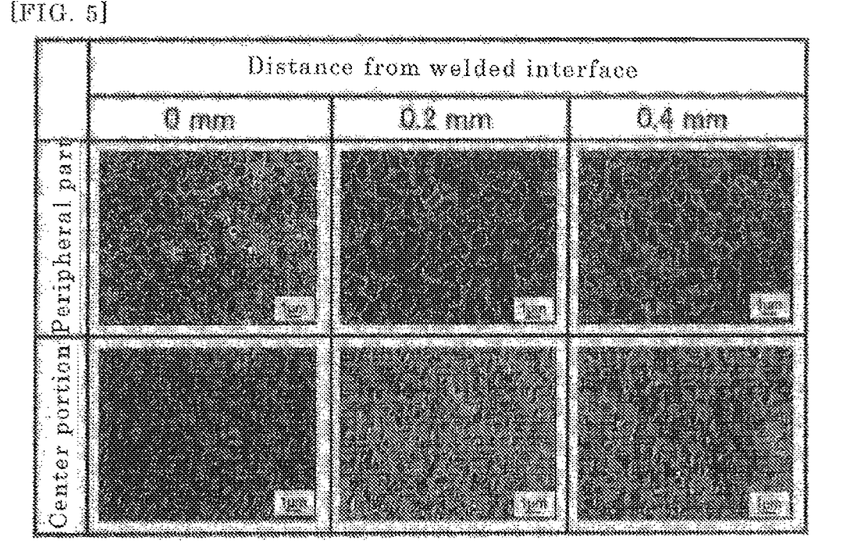
FIG. 5 is photographs of the structures of the peripheral portion and center portion in the welded interface of the present welded joint 1.

FIG. 5 is photographs of the structures of the peripheral portion and center portion in the welded interface. Both in the peripheral portion and center portion, the martensite was not formed, but the structure of the fine equi-axed recrystallized grain was formed. This result shows the fact that the maximum welding temperature during the friction welding was equal to or less than the $A_1$ point of the S45C. Since the welding temperature of the peripheral is higher than that of the center portion, the grain size of the peripheral is larger than that of the center portion due to the difference of the welding temperatures.

Further, when the center portion of the welded interface was subjected to EBSD analysis, a small angle boundary was introduced into a part of the crystal grains, and it has been observed that orientation was changed. This is caused by the introduction of the strain deformation, and, in the friction welding method of the present invention, it has been clear that the influence due to the processing against the member to be welded was large. For the EBSD analysis, there were used FE-SEM (JSM-7001FA available from JEOL Ltd.) and OIM data Collection ver 5.31 available from TSL Ltd.

Example 2

The present welded joint 2 was obtained in the same manner as in Example 1 except that the rotation speed used in the friction welding was 150 rpm. Further, the state of the welding and the maximum temperature reached during welding were evaluated in the same manner as in Example 1, and the results are shown in TABLE 1 and FIG. 3, respectively.

Example 3

The present welded joint 3 was obtained in the same manner as in Example 1 except that the rotation speed used in the friction welding was 250 rpm. Further, the state of the welding and the maximum temperature reached during welding were evaluated in the same manner as in Example 1, and the results are shown in TABLE 1 and FIG. 3, respectively.

Example 4

The present welded joint 4 was obtained in the same manner as in Example 1 except that the rotation speed used in the friction welding was 300 rpm. Further, the state of the welding and the maximum temperature reached during welding were evaluated in the same manner as in Example 1, and the results are shown in TABLE 1 and FIG. 3.

Example 5

The present welded joint 5 was obtained in the same manner as in Example 1 except that, in the friction welding, the burn-off length was 2 mm and the friction pressure was 240 MPa. Further, the state of the welding and the maximum temperature reached during welding were evaluated in the same manner as in Example 1, and the results are shown in TABLE 1 and FIG. 3, respectively.

Example 6

The present welded joint 6 was obtained in the same manner as in Example 5 except that, in the friction welding, the friction pressure was 300 MPa. Further, the state of the welding and the maximum temperature reached during welding were evaluated in the same manner as in Example 1, and the results are shown in TABLE 1 and FIG. 3, respectively.

Example 7

The present welded joint 7 was obtained in the same manner as in Example 1 except that the material of the member to be welded was JIS-SK105 (1.03% C-0.94% Mn-0.30% Si—0.43% Cr) and the friction welding conditions were the rotation speed: 300 rpm, the friction pressure: 240 MPa, the burn-off length: 2 mm, the upset pressure: 240 MPa.

Example 8

The present welded joint 8 was obtained in the same manner as in Example 7 except that, during the friction welding, the external cooling by using the liquid $CO_2$ was applied near the interface to be welded.

Comparative Example 1

The comparative welded joint 1 was obtained in the same manner as in Example 1 except that the rotation speed used in the friction welding was 100 rpm. Further, the state of the welding was evaluated in the same manner as in Example 1, and the result is shown in TABLE 1. The maximum temperature reached during welding could not be measured, because the state of the member to be welded during the welding process was not stable.

Comparative Example 2

The comparative welded joint 2 was obtained in the same manner as in Example 1 except that the rotation speed used in the friction welding was 500 rpm. Further, the state of the welding and the maximum temperature reached during welding were evaluated in the same manner as in Example 1, and the result is shown in TABLE 1.

Comparative Example 3

The comparative welded joint 3 was obtained in the same manner as in Example 7 except that the friction welding conditions were the rotation speed: 2000 rpm, the friction pressure: 80 MPa, the burn-off length: 3 mm, the upset pressure: 160 MPa.

Comparative Example 4

The comparative welded joint 4 was obtained in the same manner as in Example 1 except that the material of the member to be welded was JIS-FC205 (3.48% C-3.29% Si—0.42% Mn-0.05% P-0.015% S) and the friction welding conditions were the rotation speed: 6000 rpm, the friction pressure: 50 MPa, the burn-off length: 3 mm, the upset pressure: 75 MPa.

Comparative Example 5

The comparative welded joint 5 was obtained in the same manner as in Comparative Example 4 except that the rotation speed used in the friction welding was 4500 rpm.

Comparative Example 6

The comparative welded joint 6 was obtained in the same manner as in Comparative Example 4 except that the rotation speed used in the friction welding was 3500 rpm.

Comparative Example 7

The comparative welded joint 7 was obtained in the same manner as in Comparative Example 4 except that the rotation speed used in the friction welding was 3000 rpm.

Comparative Example 8

The comparative welded joint 8 was obtained in the same manner as in Comparative Example 4 except that the rotation speed used in the friction welding was 2500 rpm.

Comparative Example 9

The comparative welded joint 9 was obtained in the same manner as in Comparative Example 4 except that the rotation speed used in the friction welding was 2000 rpm.

Comparative Example 10

The comparative welded joint 10 was obtained in the same manner as in Comparative Example 4 except that the rotation speed used in the friction welding was 1500 rpm.

Comparative Example 11

The comparative welded joint 11 was obtained in the same manner as in Comparative Example 4 except that the rotation speed used in the friction welding was 1000 rpm.

TABLE 1

|  | Rotation speed (rpm) | Burn-off length (mm) | State of welding |
|---|---|---|---|
| Com. Ex. 1 | 100 | 1 | x |
| Ex. 2 | 150 | 1 | o |
| Ex. 1 | 200 | 1 | o |
| EX. 3 | 250 | 1 | o |
| Ex. 4 | 300 | 1 | o |
| Com. Ex. 2 | 500 | 1 | o |
| Ex. 5 | 200 | 2 | o |
| Ex. 6 | 300 | 2 | o |

As shown in TABLE 1, though, when the rotation speed used in the friction welding is 100 rpm (Comparative Example 1), the welding cannot be completed, when the rotation speed is equal to or more than 150 rpm, the welded part without any failure can be formed. As is seen from the results, the friction welding can be achieved even at a low rotation speed range. Since the diameter of the member to be welded is 10 mm, the maximum sliding speed during welding is 52 mm/sec in case of 100 rpm, and is 78 mm/sec in case of 150 rpm.

As shown in FIG. 3, when the rotation speed is in the range of equal to or less than 300 rpm, the maximum temperature reached during welding is equal to or less than the $A_1$ point of the S45C. The maximum sliding speed during welding is 156 mm/sec in case of 300 rpm.

Further, in the general friction welding, though the maximum temperature reached during welding rises with increase of the friction pressure, comparing Example 5 and Example 6, the maximum temperature reached during welding of Example 6 having larger friction pressure is lower. This suggests that the friction welding is based on the different welding principle from the conventional friction welding, and is a welding method where the processing heat is utilized (not a welding method where only the friction heat is utilized). In Example 1 to Example 6, elevation of the welding temperature was observed after applying the upset pressure.

Figure 6:
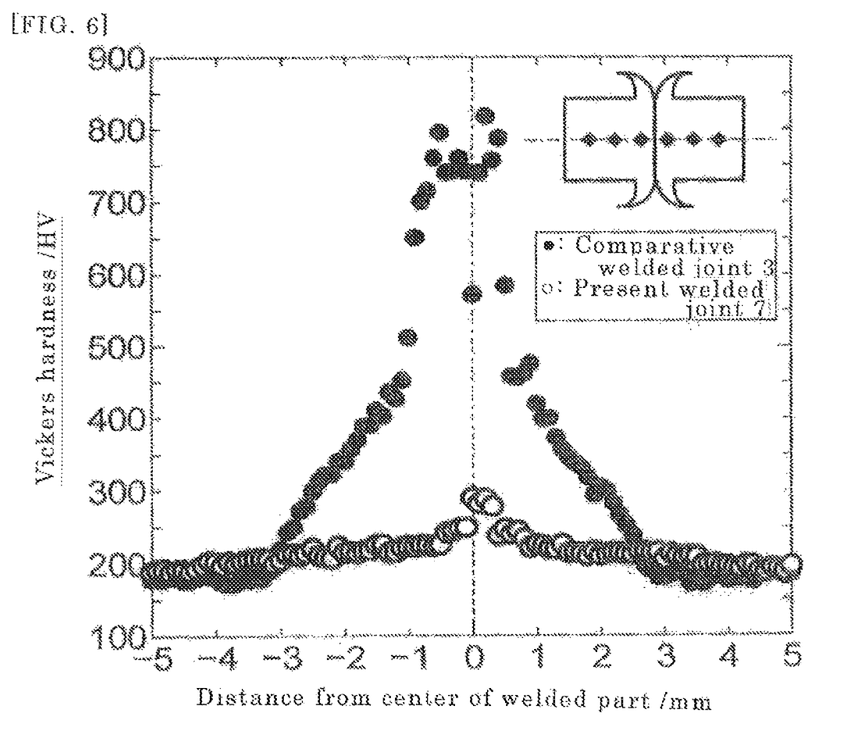
FIG. 6 is a graph showing the distributions of the Vickers hardness near the welded interface of the present welded joint 7 and the comparative welded joint 3.

FIG. 6 is a graph showing the distributions of the Vickers hardness near the welded interface of the present welded joint 7 and the comparative welded joint 3. FIG. 6 shows the results of the Vickers hardness measured from the center of the welded interface in the longitudinal direction of the joint. In the present welded joint 7, the large increase in hardness which is generated when the martensite is formed cannot be found. In the center portion (welded interface), though the hardness is increased by 50 HV, the increase is caused by the formation of the fine equi-axed recrystallized grains. In addition, there is no remarkable heat affected zone (HAZ) which is formed in the conventional friction welding joint. On the other hand, in the comparative welded joint 3, there is remarkable increase in hardness which is generated when the martensite is formed near the welded interface, and in addition thereto, the hardness of the heat affected zone (HAZ) becomes lower than the present welded joint 7. The measurement of the Vickers hardness was conducted under the conditions of load: 0.1 kgf, loading time: 15 s.

Figure 7:
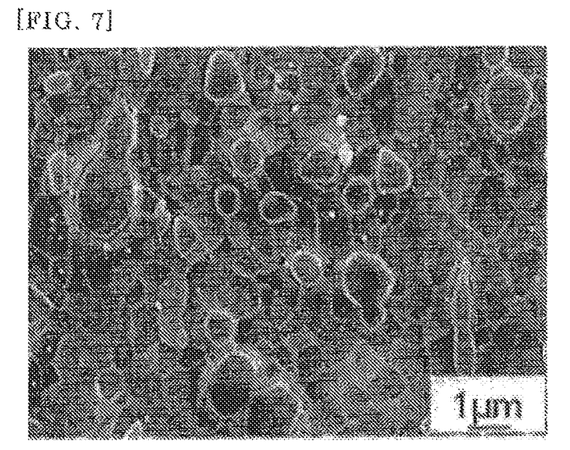
FIG. 7 is a scanning electron microscope photograph in the welded center portion of the present welded joint 7.
Figure 8:
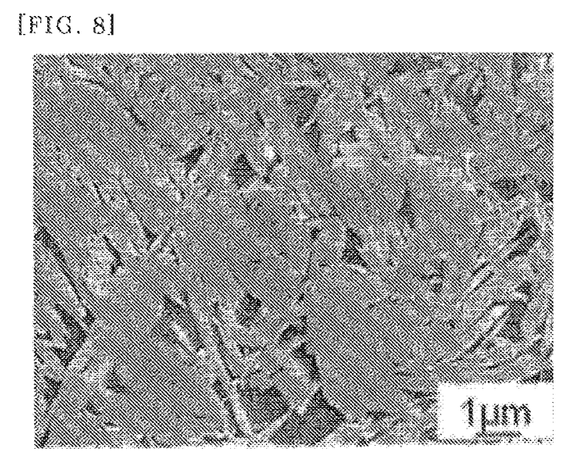
FIG. 8 is a scanning electron microscope photograph in the welded center portion of the comparative welded joint 3.

FIG. 7 and FIG. 8 are scanning electron microscope photographs of the welded center portion of the present welded joint 7 and the comparative welded joint 3, respectively. The present welded joint 7 has a structure of spherical cementite having a grain size of equal to or less than 2 μm and fine equi-axed ferrite, but the comparative welded joint 3 is composed of lens martensite.

Figure 9:
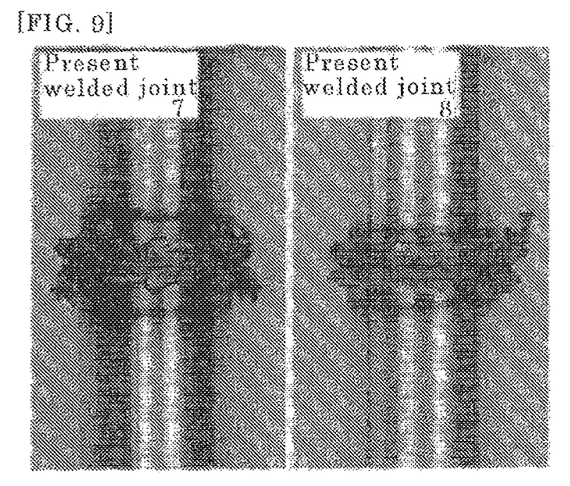
FIG. 9 is photographs of the appearances of the present welded joint 7 and the present welded joint 8.

FIG. 9 is photographs of the appearances of the present welded joint 7 and the present welded joint 8. In the present welded joint 8 where, during the friction welding, the external cooling by using a liquid $CO_2$ is applied near the interface to be welded, since the region having temper color becomes small, there is observed the lowering of the welding temperature of the peripheral part of the member to be welded by the external cooling.

Figure 10:
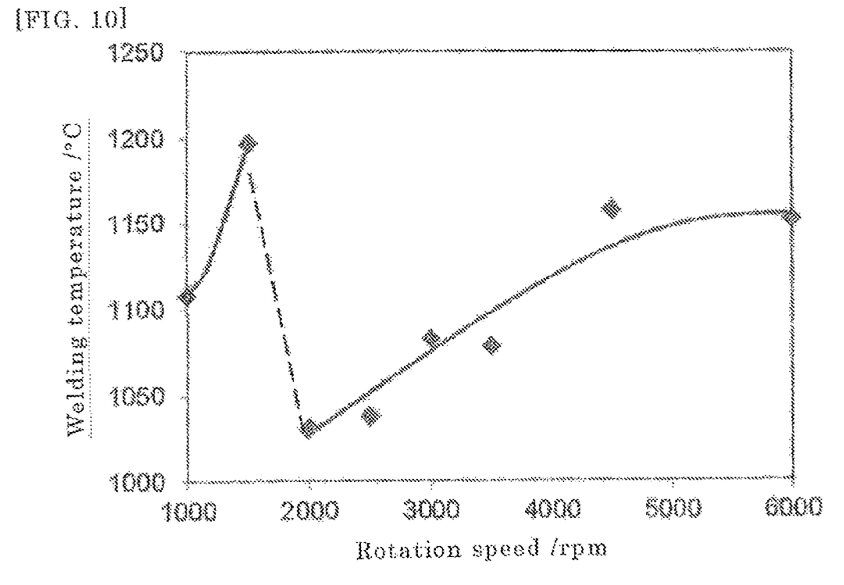
FIG. 10 is a graph showing the welding temperatures in Comparative Example 4 to Comparative Example 11.

FIG. 10 is a graph showing the welding temperatures in Comparative Example 4 to Comparative Example 11. The welding temperature is the temperature of the surface of the welded part which is measured by using a radiation thermometer. In the range of 2000 rpm to 6000 rpm, the welding temperature is lowered with the decrease of the rotation speed, which shows that the heat is generated mainly due to the friction heat. To the contrary, the welding temperature at 1500 rpm is higher than the welding temperature at 2000 rpm, which shows the result that the friction heat and the processing heat are generated together (it is seemed that the processing heat in the present invention means the increased amount of heat observed in this phenomenon). The welding at 1500 rpm (Comparative Example 10) is not the present example because the rotation speed is remarkably low in comparison with the peripheral speed defined in the above JIS Z 3607, and it is clear that the processing heat is not used in the conventional friction welding.

EXPLANATION OF SYMBOLS 2, 4 Member to be welded
6 Softened region
8 Flash
10 Welded part
12 Welded interface

The invention claimed is:
1. A friction welding method where two metal members to be welded are caused to slide relative to each other while surfaces of the two metal members are in contact with each other, so as to form a weld therebetween, wherein;
   at least one of the metal members to be welded is a ferrous material, and
   a maximum temperature reached during welding is equal to or less than the $A_3$ point or equal to or less than the $A_{cm}$ point of the ferrous material,
   a friction heat generated by the sliding of the two metal members to be welded, and a processing heat generated by plastic deformation of the metal members to be welded are utilized together, and
   wherein a welding pressure which is applied in the almost perpendicular to the surface to be welded is 100 to 300 MPa.

2. The friction welding method according to claim 1, wherein the maximum temperature reached during welding is equal to or less than the Ai point of the ferrous material.

3. The friction welding method according to claim 1, wherein a maximum sliding speed of the metal member to be welded is 75 to 160 mm/sec.

4. The friction welding method according to claim 1, wherein the two metal members to be welded are both in the form of column, and end surfaces of the two metal members to be welded are made to rotate in contact with each other.

5. The friction welding method according to claim 1, wherein a rotation speed is 150 to 300 rpm.

6. The friction welding method according to claim 1, wherein an upset pressure is 100 to 300 MPa, and a burn-off length is 0.5 to 3 mm.

7. The friction welding method according to claim 1, wherein a carbon content of the ferrous material is equal to or more than 0.2% by mass.

8. The friction welding method according to claim 1, wherein the ferrous material is a high speed steel.

9. The friction welding method according to claim 1, wherein an adjacent area of an interface to be welded is cooled forcibly by supplying a refrigerant to the adjacent area of the interface to be welded during welding.

* * * * *